US007778176B2

(12) United States Patent
Morford

(10) Patent No.: US 7,778,176 B2
(45) Date of Patent: Aug. 17, 2010

(54) METHODS, APPARATUSES AND SYSTEMS FACILITATING CONCURRENT CLASSIFICATION AND CONTROL OF TUNNELED AND NON-TUNNELED NETWORK TRAFFIC

(75) Inventor: Michael Robert Morford, Saratoga, CA (US)

(73) Assignee: Packeteer, Inc., Cupertino, CA (US)

( * ) Notice: Subject to any disclaimer, the term of this patent is extended or adjusted under 35 U.S.C. 154(b) by 192 days.

(21) Appl. No.: 11/951,101

(22) Filed: Jan. 14, 2008

(65) Prior Publication Data

US 2008/0095054 A1 Apr. 24, 2008

(51) Int. Cl.
*H04J 1/00* (2006.01)
(52) U.S. Cl. ........................................ 370/231; 370/235
(58) Field of Classification Search ........................ None
See application file for complete search history.

(56) References Cited

U.S. PATENT DOCUMENTS 7,032,022 B1 * 4/2006 Shanumgam et al. ....... 709/225
7,149,222 B2 * 12/2006 Wiryaman et al. .......... 370/401

* cited by examiner

*Primary Examiner*—Frank Duong
(74) *Attorney, Agent, or Firm*—Baker Botts L.L.P.

(57) ABSTRACT

Methods, apparatuses and systems facilitating the concurrent classification and control of tunneled and non-tunneled data flows in a packet-based computer network environment. As discussed in more detail below, embodiments of the present invention allow for the "intra-tunnel" classification of data flows and, based on the classification, the deterministic and intelligent application of aggregate bandwidth utilization controls on data flows corresponding to a given tunnel. Embodiments of the present invention allow for the allocation of bandwidth on an application-level basis between tunneled and non-tunneled traffic, as well as between applications within a given tunnel. Other embodiments of the present invention can be configured to provide a differentiated security model for non-tunneled and tunneled traffic. In addition, embodiments of the present invention can be further configured to implement a layered security model for tunneled traffic.

22 Claims, 7 Drawing Sheets

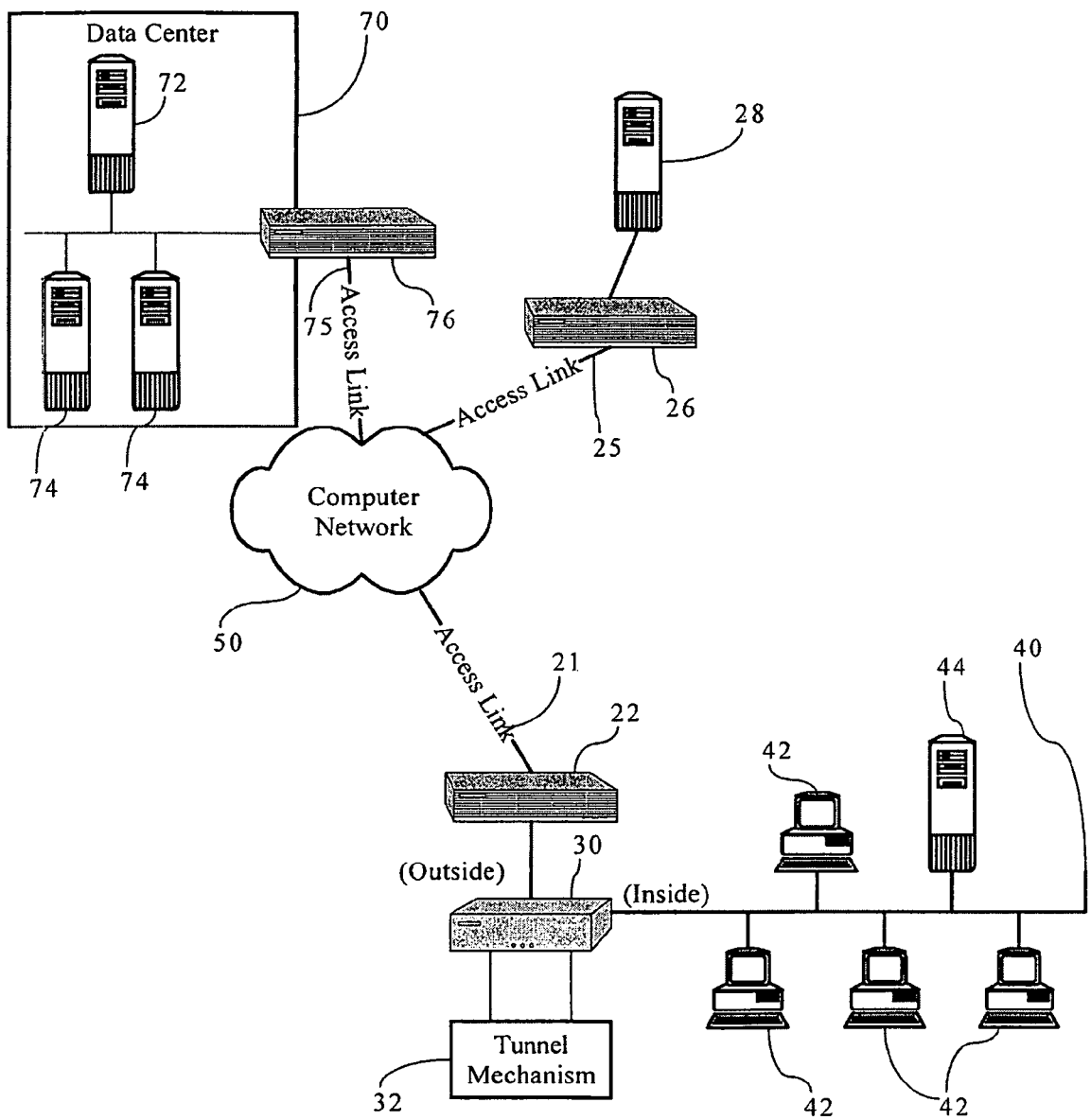
Fig._1

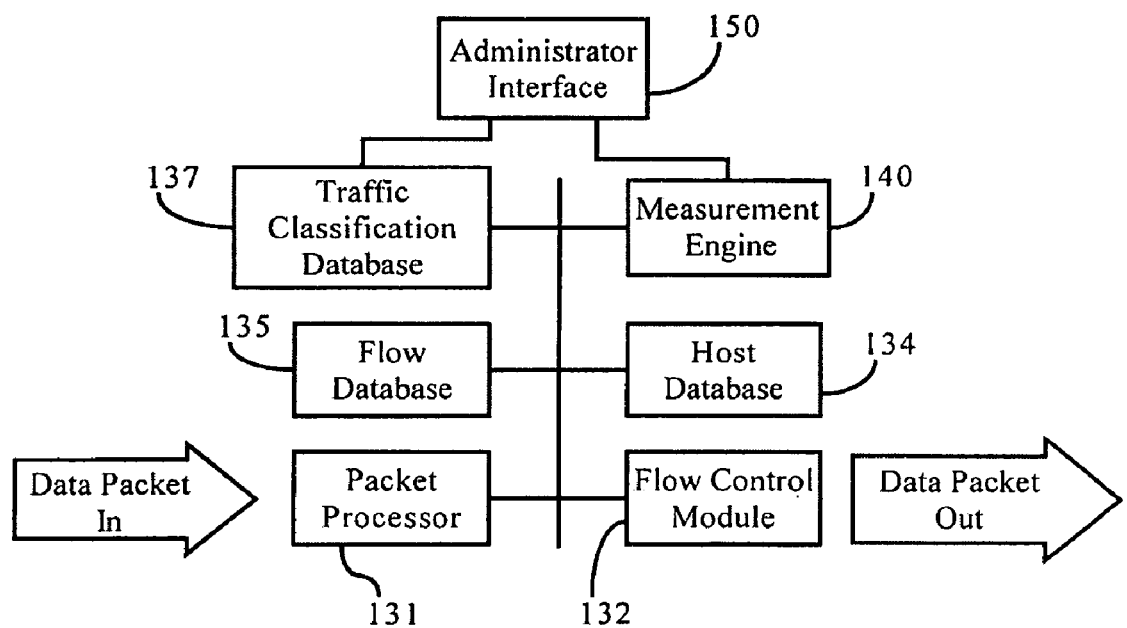
Fig._3

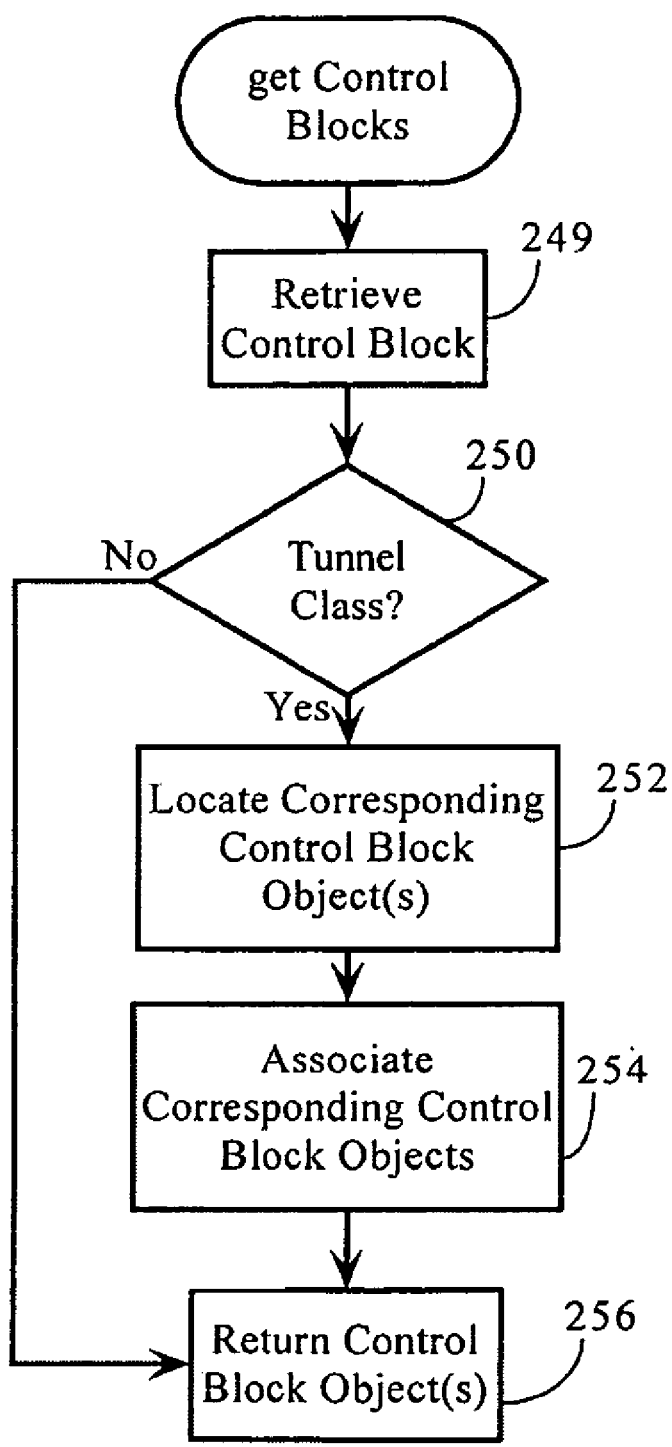
Fig._4B

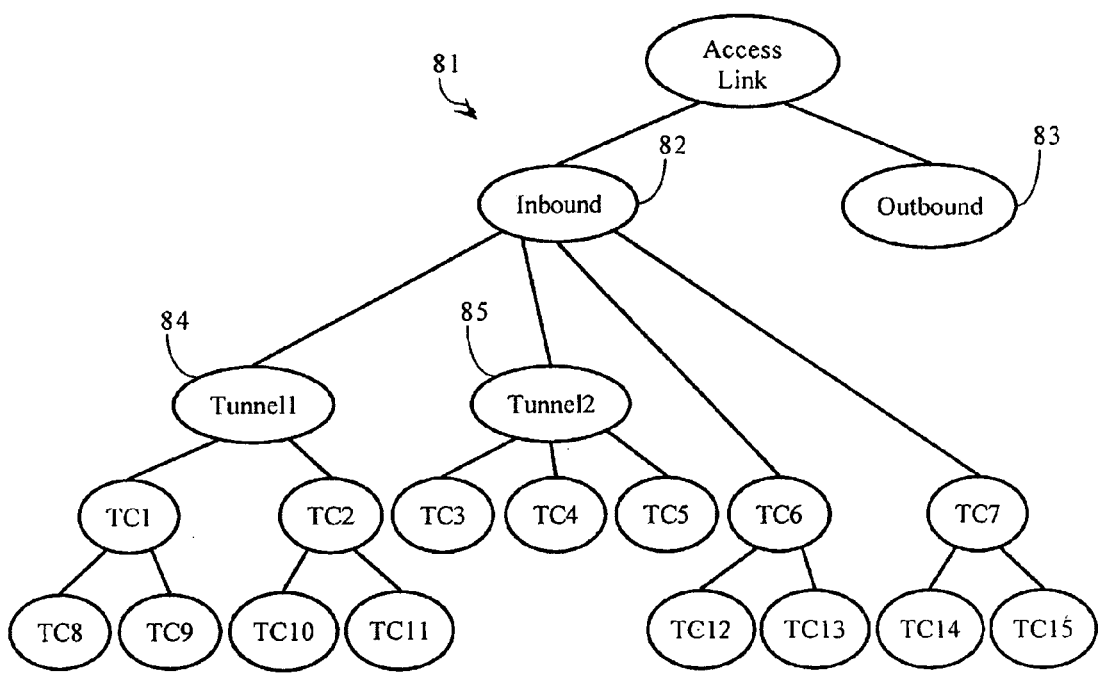
Fig._5

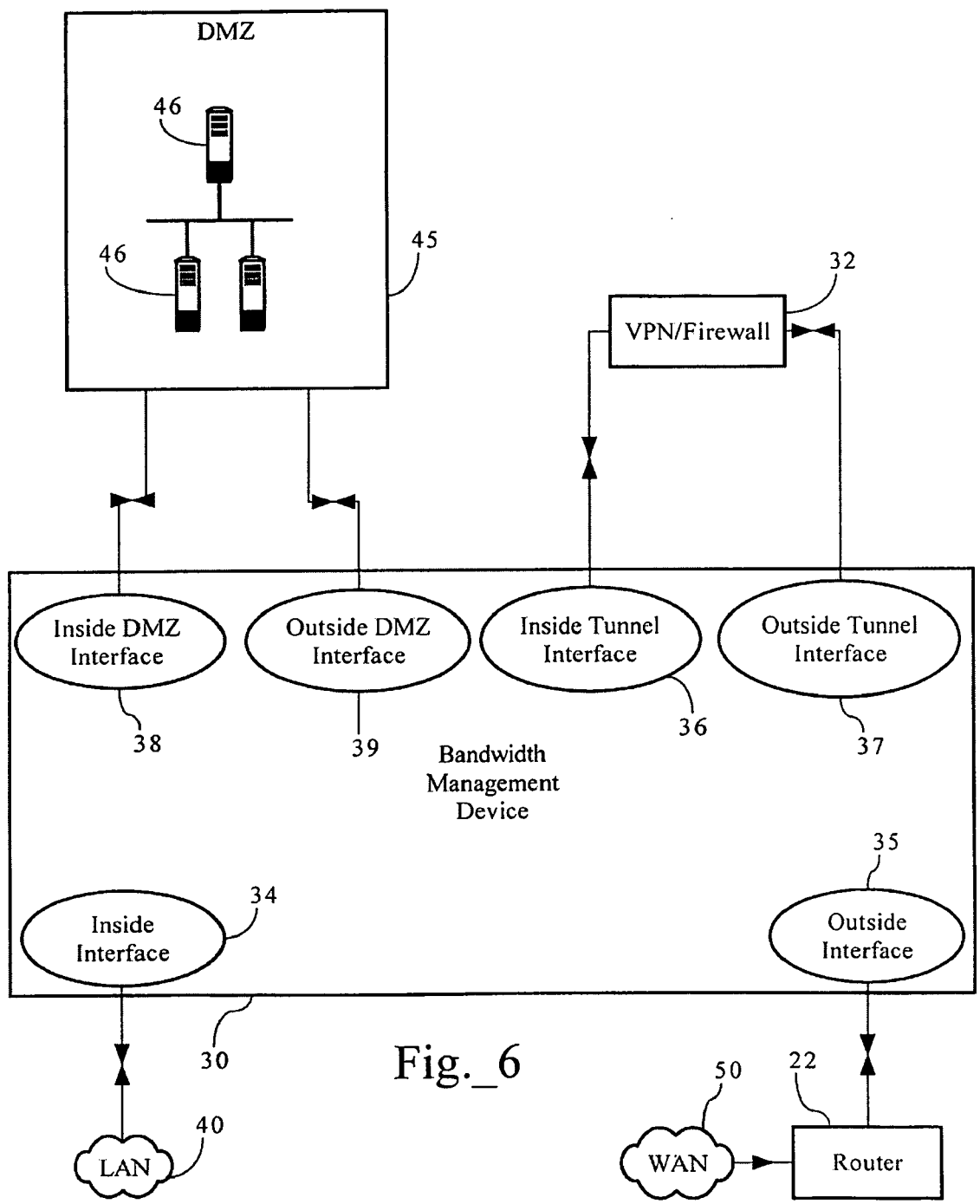
Fig._6

METHODS, APPARATUSES AND SYSTEMS FACILITATING CONCURRENT CLASSIFICATION AND CONTROL OF TUNNELED AND NON-TUNNELED NETWORK TRAFFIC

CROSS-REFERENCE TO RELATED APPLICATIONS

The present application claims priority from U.S. patent application Ser. No. 10/260,802 filed on Sep. 30, 2002 and entitled "Methods, Apparatuses and Systems Facilitating Concurrent Classification and Control of Tunneled and Non-Tunneled Network Traffic" and is herein incorporated by reference.

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/966,538, in the name of Guy Riddle, entitled "Dynamic Partitioning of Network Resources;"

U.S. patent application Ser. No. 10/039,992, in the Michael J. Quinn and Mary L. Laier, entitled "Method and Apparatus for Fast Lookup of Related Classification Entities in a Tree-Ordered Classification Hierarchy;"

U.S. patent application Ser. No. 10/015,826, in the name of Guy Riddle, entitled "Dynamic Tunnel Probing in a Communications Network;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936, in the name of Guy Riddle, Robert L. Packer and Mark Hill, entitled "Method for Automatically Classifying Traffic with Enhanced Hierarchy in a Packet Communications Network;" and U.S. patent application Ser. No. 10/177,518, in the name of Guy Riddle, entitled "Methods, Apparatuses and Systems Allowing for Progressive Network Resource Utilization Control Scheme."

FIELD OF THE INVENTION

The present invention relates to management of computer network bandwidth and, more particularly, to methods, apparatuses and systems facilitating the concurrent classification and control of tunneled and non-tunneled network traffic.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to ensure a minimum bandwidth and/or cap bandwidth as to a particular class of traffic. An administrator specifies a traffic class (such as FTP data, a subnet, or data flows involving a specific user, etc.) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user). In addition, certain bandwidth management devices allow administrators to define a partition hierarchy by configuring one or more partitions dividing the access link and further dividing the parent partitions into one or more child partitions.

To facilitate the implementation, configuration and management tasks associated with bandwidth management and other network devices including traffic classification functionality, various traffic classification configuration models and data structures have been implemented. For example, various routers allow network administrators to configure access control lists (ACLs) consisting of an ordered set of access control entries (ACEs). Each ACE contains a number of fields that are matched against the attributes of a packet entering or exiting a given interface. In addition, each ACE has an associated action that indicates what the routing system should do with the packet when a match occurs. ACLs can be configured to accomplish or facilitate a variety of tasks, such as security, redirection, caching, encryption, network address translation, and policy routing. Once configured by an administrator, the routing system compiles the ACL into a hash table to expedite the Look up process during operation of the system.

In addition, U.S. Pat. No. 6,412,000 discloses methods and system that automatically classify network traffic according to a set of classification attributes. As this application teaches, the traffic classification configuration can be arranged in a hierarchy, where classification of a particular packet or data flow traverses a network traffic classification tree until a matching leaf traffic class, if any, is found. Such prior art classification trees are data structures reflecting the hierarchical aspect of traffic class relationships, wherein each node of the tree represents a traffic class and includes a set of attributes or matching rules characterizing the traffic class. The traffic classification, at each level of the hierarchy, determines whether the data flow or packet matches the attributes of a given traffic class node and, if so, continues the process for child traffic class nodes down to the leaf nodes. In certain modes, unmatched data flows map to a default traffic class. In addition, patent application Ser. No. 10/039,992 discloses methods for caching portions of hierarchical classification trees in hash tables to optimize traffic classification lookups.

In addition, many enterprises have implemented Virtual Private Networks (VPNs) to provide individual users and/or branch offices secure remote access to the resources available over the respective enterprises' networks (such as a data center). A VPN provides the ability to use a public telecommunication infrastructure, such as the Internet, to provide remote offices or individual users with secure access to their organization's network. A VPN works by using the shared public infrastructure while maintaining privacy through security procedures and tunneling protocols such as the Layer Two Tunneling Protocol (L2TP). In effect, the protocols, by encrypting data at the sending end and decrypting it at the receiving end, send the data through a "tunnel" (achieved by encapsulating TCP packets comprising the data within VPN headers) that cannot be "entered" by data that is not property encrypted. An additional level of security involves encrypting not only the data, but also the originating and receiving computer network addresses. A typical VPN deployment involves a VPN server deployed on an enterprise's network and at least one VPN client remote from the enterprise network.

Beyond security concerns, enterprises may also use tunnels to optimize network traffic. Specifically, tunnel technologies can be implemented to improve network performance of a communications path. For example, data compression and other technologies that optimize network traffic can be deployed to improve the efficiency and performance of a computer network and ease congestion at bottleneck links. For example, implementing data compression and/or caching technology can improve network performance by reducing the amount of bandwidth required to transmit a given block of data between two network devices along a communications path. Data compression technologies can be implemented on routing nodes without alteration of client or server end systems, or software applications executed therein, to reduce bandwidth requirements along particularly congested portions of a communications path. For example, tunnel technologies, like those used in Virtual Private Network (VPN) implementations, establish tunnels through which network traffic is transformed upon entering at a first network device in a communications path and restored to substantially the same state upon leaving a second network device in the communications path.

Given such tunnel technologies, the network traffic across a particular access link can be, and often is, a combination of tunneled data flows (e.g., encapsulated and/or transformed (encrypted, compressed, etc.) data flows and non-tunneled data flows. The transformation of data flows involved in such tunnels, however, does present certain problems if a network administrator desires to manage bandwidth utilization associated with network traffic within such tunnels and outside such tunnels. As discussed above, certain bandwidth management solutions allow for classification of network traffic on an application-level basis. The transformation of data flows, however, severely impacts the ability of such bandwidth management devices to classify such data flows as the encryption or other transformation obscures the higher layer information in the data flows, and in many instances, the IP addresses of the actual source and destination hosts. Accordingly, while prior art bandwidth management devices can be configured to detect tunneled traffic, they cannot concurrently classify non-tunneled and tunneled network traffic. Moreover, the transformation of data flows, such as compression, renders it difficult to intelligently apply bandwidth utilization controls to tunneled traffic. For example, a compressed data flow may comprise 75 Kbytes of data, for example, while the de-compressed data flow may comprise 100 Kbytes. While a bandwidth management device located on the outside of a tunnel is able to adequately classify the data flow and quantify the size of the data flow associated with the de-compressed network traffic, it has no visibility into the compressed data flow and its actual impact on bandwidth utilization across an access link. The resulting lack of visibility into the actual impact of the data flow renders it difficult to intelligently apply bandwidth utilization controls (such as pacing an inbound data flow to control aggregate bandwidth utilization) in a manner that responds to the actual impact of the data flow. Similarly, for the reasons discussed above, a bandwidth management device located within the tunnel path has visibility into the actual impact of the compressed data flow, but does not have the ability to adequately classify the tunneled network traffic on an application-level or other basis.

In light of the foregoing, a need in the art exists for methods, apparatuses and systems that facilitate concurrent classification and control of tunneled and non-tunneled network traffic. Embodiments of the present invention substantially fulfill this need.

SUMMARY OF THE INVENTION

The present invention provides methods, apparatuses and systems facilitating the concurrent classification and control of tunneled and non-tunneled data flows in a packet-based computer network environment. As discussed in more detail below, embodiments of the present invention allow for the "intra-tunnel" classification of data flows and, based on the classification, the deterministic and intelligent application of aggregate bandwidth utilization controls on data flows corresponding to a given tunnel. Embodiments of the present invention allow for the allocation of bandwidth on an application-level basis between tunneled and non-tunneled traffic, as well as between applications within a given tunnel. Other embodiments of the present invention can be configured to provide a differentiated security model for non-tunneled and tunneled traffic. In addition, embodiments of the present invention can be further configured to implement a layered security model for tunneled traffic.

DESCRIPTION OF THE DRAWINGS

FIG. 1 is a functional block diagram showing a computer network environment including a bandwidth management device according to an embodiment of the present invention.

FIG. 3 is a functional block diagram setting forth the functionality in a bandwidth management device according to an embodiment of the present invention.

FIG. 4B is a flow chart illustrating a method involving association of control block objects corresponding to tunneled traffic before and after transformation of data flows.

FIG. 5 is a diagram illustrating, for didactic purposes, part of a hierarchical traffic classification configuration including intra-tunnel network traffic classification, as well as classification of non-tunneled network traffic.

FIG. 6 is a functional block diagram illustrating the paths and corresponding interfaces associated with a bandwidth management device according to a second embodiment of the present invention.

DESCRIPTION OF PREFERRED EMBODIMENT(S)

I. Exemplary Operating Environment

Figure 2A:
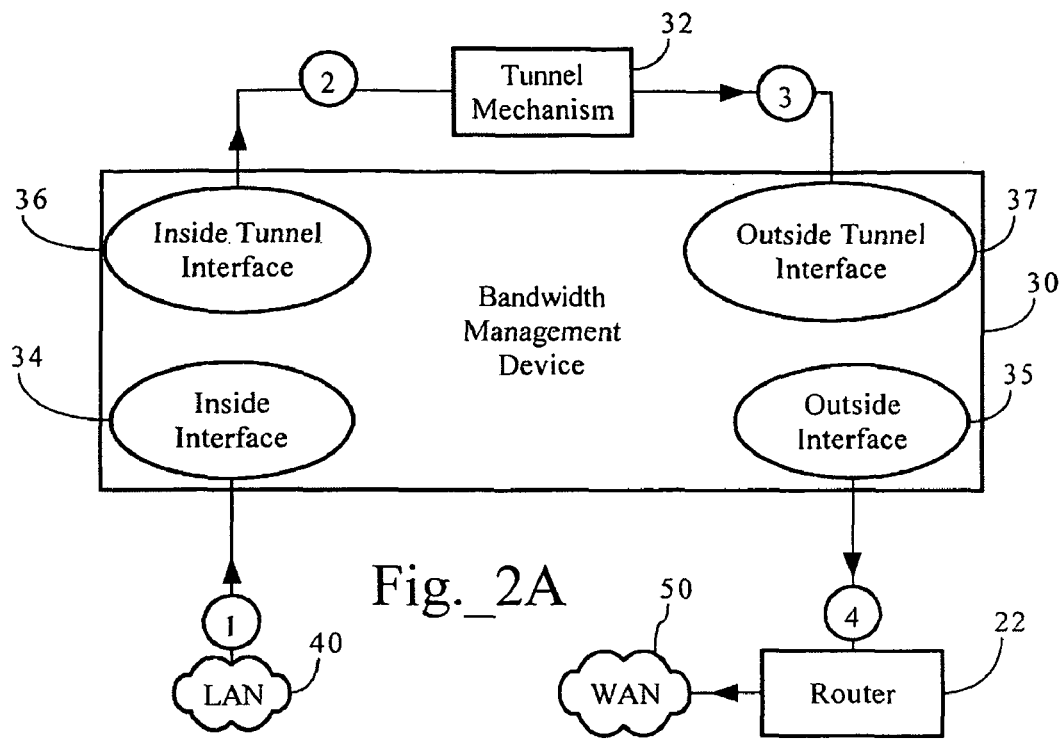
FIG. 2A is a functional block diagram illustrating the path, according to an embodiment of the present invention, of outbound data flows through a tunnel mechanism and a bandwidth management device.

FIG. 1 sets forth a packet-based computer network environment including a bandwidth management device 30 operably connected to a tunnel mechanism 32. As FIG. 1 shows, local area computer network 40 interconnects several TCP/IP end systems, including client devices 42 and server device 44, and provides access to resources (such as data center 70, server 28, etc.) operably connected to computer network 50 via router 22 and access link 21. Access link 21 is a physical and/or logical connection between two networks, such as computer network 50 and local area network 40. Server 28 is a remote TCP end system connected to computer network 50 through router 26 and access link 25. Server 28 represents a computer network resource, such as a public web site, an FTP server, etc. The computer network environment, including computer network 50 is a packet-based communications environment, employing TCP/IP protocols, and/or other suitable protocols, and has a plurality of interconnected digital packet transmission stations or routing nodes. Bandwidth management device 30 is provided between router 22 and local area computer network 40. Bandwidth management device 30 is operative to classify data flows and, depending on the classification, enforce respective bandwidth utilization controls on the data flows to control bandwidth utilization across and optimize network application performance across access link 21. Tunnel mechanism 32 is operative to establish and maintain transformation tunnels with compatible nodes or other network devices in a communications path.

Data center 70 is a central data processing and/or storage facility associated with an enterprise. Data center 70, in one embodiment, comprises VPN server 72 and servers 74. VPN server 72 is operative to establish secure tunnels with remote devices over computer network 50 to allow for access to resources maintained within data center 70. Servers 74 are computing resources (such as a database server, an application server, a data processing server, etc.) accessible to remote users and devices via router 76 and access link 75 over a VPN connection established between VPN server 72 and a remote VPN client. In one embodiment, tunnel mechanism 32 is operative to establish a secure communications tunnel with VPN server 70 to allow secure remote access to servers 74 for users at client devices 42, for example, or applications executed on server 44.

A. Bandwidth Management Device

FIG. 3 is a block diagram illustrating functionality, according to one embodiment of the present invention, included in bandwidth management device 30. In one embodiment, bandwidth management device 30 comprises packet processor 131, flow control module 132, measurement engine 140, traffic classification database 137, and administrator interface 150. Packet processor 131 is operative to detect new data flows and construct data structures including attributes characterizing the data flow. Flow control module 132 is operative to enforce bandwidth utilization controls on data flows traversing bandwidth management device 30. Traffic classification database 137 is operative to analyze data flow attributes and identify traffic classes corresponding to the data flows, as discussed more fully below. In one embodiment, traffic classification database 137 stores traffic classes associated with data flows encountered during operation of bandwidth management device 30, as well as manually created traffic classes and a hierarchical traffic class structure, if any, configured by a network administrator. In one embodiment, traffic classification database 137 stores traffic classes, in association with pointers to bandwidth utilization controls or pointers to data structures defining such bandwidth utilization controls. Measurement engine 140 maintains measurement data relating to operation of bandwidth management device 30 to allow for monitoring of bandwidth utilization across access link 21 with respect to a plurality of bandwidth utilization and other network statistics on an aggregate and/or per-traffic-class level.

Administrator interface 150 facilitates the configuration of bandwidth management device 30 to adjust or change operational and configuration parameters associated with the device. For example, administrator interface 150 allows administrators to select identified traffic classes and associate them with bandwidth utilization controls, such as an aggregate bandwidth utilization control, as well as other controls. Administrator interface 150 also displays various views associated with a hierarchical traffic classification scheme and allows administrators to configure or revise the hierarchical traffic classification scheme as discussed more fully below. Administrator interface 150 can be a command line interface or a graphical user interface accessible, for example, through a conventional browser on client device 42.

Figure 2B:
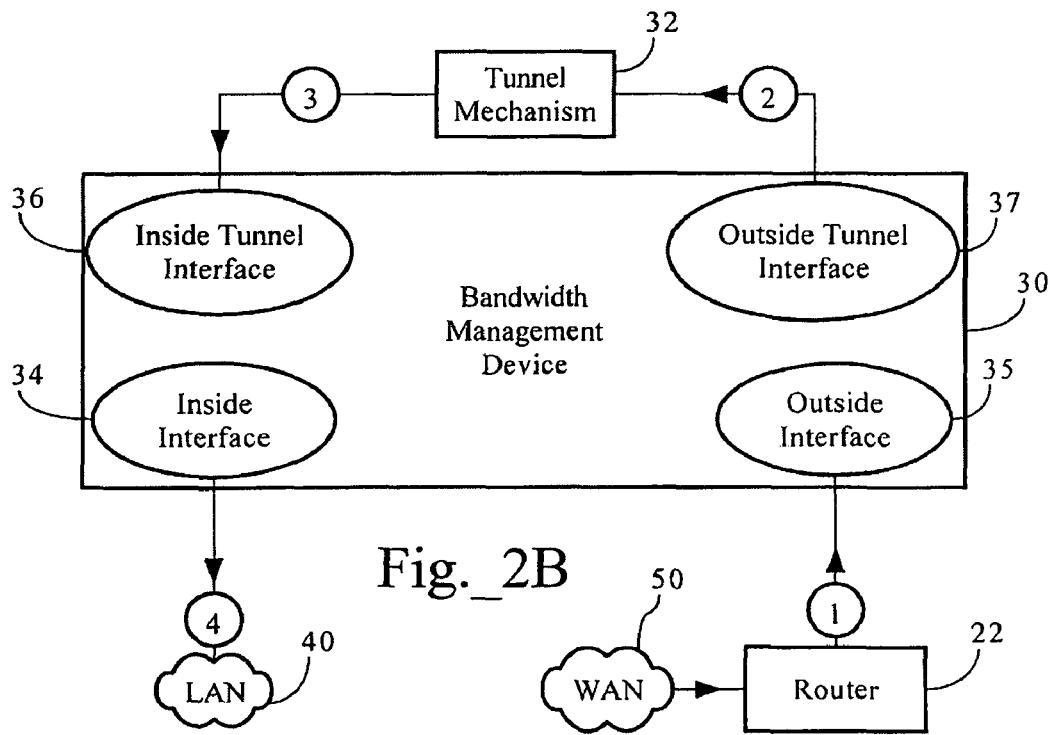
FIG. 2B is a functional block diagram illustrating the path, according to an embodiment of the present invention, of inbound data flows through a tunnel mechanism and a bandwidth management device.

FIGS. 2A and 2B set forth the communications interfaces associated with bandwidth management device 30 according to an embodiment of the present invention. As FIGS. 2A and 2B provide, bandwidth management device 30, in one embodiment, comprises inside interface 34, outside interface 35, inside tunnel interface 36, and outside tunnel interface 37. Inside interface 34 represents the hardware and software components implementing the communications interface to computer network 40. Similarly, outside interface 35 is the communications interface to router 22. Inside tunnel interface 36 is the inside communications interface to tunnel mechanism 32, while outside tunnel interface 37 is the outside communications interface to tunnel mechanism 32.

FIGS. 2A and 2B also illustrate the respective paths, according to an embodiment of the present invention, of outbound and inbound data flows through tunnel mechanism 32 and bandwidth management device 30. As discussed in more detail below, outbound data flows emanating from computer network 40 (FIG. 2A, Ref. No. 1) enter inside interface 34. Bandwidth management device 30, in response, constructs a control block object including attributes characterizing the flow (see below) to allow for classification of the data flow. Bandwidth management device 30 then transmits the data flow from inside tunnel interface 36 to tunnel mechanism 32 (FIG. 2A, Ref. No. 2). Tunnel mechanism 32 conditionally operates on the data flow (i.e., if the data flow requires transformation) to transform the data flow as required to transmit the data to a tunnel partner (e.g., encapsulation, encryption, compression, etc.) and transmits the transformed data flow to outside tunnel interface 37 (FIG. 2A, Ref. No. 3). Bandwidth management device 30, in one embodiment, essentially treats the transformed data flow as a new data flow (constructing a control block object including attributes characterizing the data flow) and further associates the control block object corresponding to the native flow with the current control block object to allow for intelligent application of bandwidth utilization controls, as discussed more fully below, to egress of the transformed data flow (FIG. 2A, Ref. No. 4).

In the inbound direction, bandwidth management device 30 and tunnel mechanism 32 operate in a similar manner. Specifically, inbound network traffic emanating from wide area network 50 enters outside interface 35 (FIG. 2B, Ref. No. 1). Bandwidth management device 30 classifies the data flow, as discussed herein, and transmits the data flow to tunnel mechanism 32 from outside tunnel interface 37 (FIG. 2B, Ref. No. 2). Tunnel mechanism 32 operates on the data flow and transmits it to inside tunnel interface 36 (FIG. 2B, Ref. No. 3). Bandwidth management device 30 then classifies the data flow for the application of bandwidth utilization controls (such as the pacing of acknowledgement packets) and transmits the data flow from inside interface 34 to local area network 40 (FIG. 2B, Ref. No. 4). In addition, the functionality of bandwidth management device 30 and tunnel mechanism 32 can be incorporated into a unitary device. In such an embodiment, the communication paths discussed above can be virtual connections between the tunnel functionality and the bandwidth management functionality.

Moreover, although the bandwidth management device 30 illustrated in FIGS. 2A and 2B includes two inside/outside interface pairs, embodiments of bandwidth management device 30 can be configured to include additional inside/outside interface pairs as required to achieve various objectives. For example, as FIG. 6 illustrates, bandwidth management device 30 may further include inside DMZ interface 38 and outside DMZ interface 39 collectively providing communications interfaces for public servers 46 (serving an enterprise's website content, for example, and/or acting as a proxy server for requests from client devices 42 for resources accessible over computer network 50) in DMZ network 45. Bandwidth management device 30, in one embodiment, is configured to route outbound data flows from DMZ network 45 directly to computer network 50 via outside interface 35. In another embodiment, bandwidth management device 30 can be configured to route outbound data flows from DMZ network 45 to VPN/firewall 32, receive them back after processing by that device, and then route them on to computer network 50. Inbound data flows destined for DMZ network 45 can be routed in similar manners.

A.1. Packet Processing

In one embodiment, when packet processor 131 encounters a new data flow it stores the source and destination IP addresses contained in the packet headers in host database 134. Packet processor 131 further constructs a control block object including attributes characterizing a data flow between two end systems. In one embodiment, a control block object contains a flow specification object including such attributes as pointers to the "inside" and "outside" IP addresses in host database 134, as well as other flow specification parameters, such as inside and outside port numbers, service type, protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, in one embodiment, a flow specification object includes an "inside" and "outside" address relative to bandwidth management device 30. See FIG. 1. For a TCP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, number of packets, aggregate bytes, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow.

In one embodiment, packet processor 131 constructs control block objects in a control block object space, which (in one embodiment) is a computer-readable medium, or an allocated portion thereof, allowing for storage, access to and modification of control block objects including attributes defining various data flows traversing bandwidth management device 30. In one embodiment, the control block object space is finite allowing for the storage of only a limited number of control block objects at any one time. In one embodiment, the control block object space resides in dynamic memory, such as RAM. In one embodiment, bandwidth management device 30 maintains a Least-Recently Used (LRU) list of control block objects corresponding to inactive data flows based on the last packet time associated with the control block objects. In one embodiment, packet processor 131 adds pointers to the LRU list as the corresponding flows become inactive (e.g., when a TCP connection is closed, or a threshold period of inactivity is reached, etc.). In one embodiment, when a new data flow is detected and the control block object space is depleted, packet processor 131 selects the least-recently used control block object from the LRU list and overwrites the control block object space with a new control block object corresponding to the new data flow.

As discussed above, bandwidth management device 30 constructs a control block object and classifies the data flows, whether entering from inside/outside interface 34, 35 or inside/outside tunnel interface 36, 37, in an identical manner. To allow for application of traffic classification and control functionality discussed herein, however, packet processor 131 is also operative to associate control block objects created in response to data flows transmitted from tunnel mechanism 32 to at least one control block object corresponding to counterpart data flows received on either inside interface 34 or outside interface 35.

A.2. Flow Control Module

As discussed above, flow control module 132 enforces bandwidth utilization controls (and, in some embodiments, other policies) on data flows traversing access link 21. A bandwidth utilization control for a particular data flow can comprise an aggregate bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents set forth above for controlling the rate of data flows. Bandwidth management device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

A.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

In one embodiment, bandwidth management device 30 can be configured to provide for dynamic partition parameters for child traffic classes of a parent tunnel traffic class, wherein the dynamic partition parameters depend on the then-current state of the parent tunnel partition parameters. For example, a network administrator may configure a fixed (or burstable) partition for the parent tunnel traffic class and configure child partitions for the child traffic classes, wherein the partition parameters are expressed as percentages or shares of the parent partition. For example, a child traffic class may be configured to include a partition having a minimum rate configured as a percentage of the parent partition and burstable to consume the up to a second configured percentage or the entire bandwidth allocated to the parent partition.

A.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. As discussed in more detail below, a discard policy can be used as part of a security scheme to drop packets and, therefore, prevent the egress or ingress of unauthorized data flows. Other policy types include redirection policies where an inbound request designating a particular resource, for example, is redirected to another server.

A.3. Traffic Classification

A traffic class comprises a set of matching rules or attributes allowing for logical grouping of data flows that share the same characteristic or set of characteristics—e.g., a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, bandwidth management device 30 includes functionality allowing for classification of network traffic based on information from layers 2 to 7 of the OSI reference model.

In one embodiment, bandwidth management device 30 is configured to include a predefined set of traffic classes based upon a knowledge base gleaned from observation of common or known traffic types on current networks. Bandwidth management device 30, in one embodiment, also allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. As discussed below, administrator interface 150 also allows for the selection and arrangement of traffic classes into hierarchical structure, such as a hierarchical tree or directory structure.

Traffic classification database 137 stores traffic classes associated with data flows that traverse access link 21. Traffic classification database 137, in one embodiment, stores the traffic classes and corresponding data (e.g., matching rules, policies, and partition pointers, etc.) related to each traffic class in a hierarchical tree. This tree is organized to show parent-child relationships that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. Additionally, at one level, a network administrator may configure a tunnel traffic class corresponding to a particular tunnel or group of tunnels (e.g., one or more VPN connections to a sales division, etc.) and then configure child traffic classes to identify specific application traffic associated with the tunnel or tunnel group.

In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree (see above). Bandwidth management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type.

A.3.a. Classification of Tunneled and Non-Tunneled Network Traffic

FIG. 5 illustrates, for didactic purposes, an exemplary network traffic classification configuration according to an embodiment of the present invention. As FIG. 5 illustrates, at a first level, a hierarchical network traffic classification scheme can be configured, in one embodiment, to include an inbound traffic node 82 and an outbound traffic node 83. As discussed above, each traffic class node has one or more matching attributes that define the characteristics of the corresponding traffic class. At a second level, the hierarchical network traffic classification scheme is configured to classify network traffic on the basis of being tunneled traffic (e.g. Tunnel1 84 or Tunnel2 85) or non-tunneled traffic (e.g., traffic class TC6 or TC7). Furthermore, as FIG. 5 provides, a network administrator may further configure child traffic class nodes (such as TC1, TC2, TC12, etc.) of the parent traffic class nodes. A similar traffic classification configuration can be attached to the outbound traffic class node 83. Of course, one skilled in the art will recognize that the hierarchical network traffic classification depicted in FIG. 5 is for didactic purposes only and that bandwidth management device 30 can be configured to implement a variety of hierarchical network traffic classification schemes.

To allow for identification tunneled traffic and for identification of specific tunnels, the matching attributes associated with the tunnel traffic class nodes, in one embodiment, comprise at least one set of the computer network addresses associated with the end points of a given tunnel, as well as at least one inside/outside computer network address or subnet pairs corresponding to the given end systems using the tunnel. As discussed in more detail below, the IP addresses of the tunnel end points allows bandwidth management device 30 to associate a data flow with a specific tunnel traffic class before the data flow is transformed into its native or original form.

Similarly, the inside/outside IP address/subnet pairs allow for identification of a specific tunnel after the data flow is transformed into its native or original format. Accordingly, as part of the configuration process, a network administrator defines these IP address and/or subnet values as matching attributes in the appropriate tunnel traffic class node.

A.3.b. Traffic Type Identification and Automatic Traffic Classification

In one embodiment, a traffic discovery engine (not shown) is operative to apply predefined sets of matching criteria to identify a traffic type associated with data flows traversing bandwidth management device 30. In one embodiment, the traffic discovery engine creates traffic classes automatically in response to data flows traversing bandwidth management device 30 and stores such traffic classes in traffic classification database 137. Automatic traffic classification is disclosed in U.S. Pat. No. 6,412,000, which is incorporated herein by reference. In one embodiment, the traffic discovery engine must detect a minimum number of data flows within a predefined period for a given traffic type before it creates a traffic class in traffic classification database 137. In one embodiment, such discovered traffic classes are, by default, attached to or associated with either a "/inbound/autodiscovered/" or "/outbound/autodiscovered/" bandwidth control category, as appropriate. In addition, as one skilled in the art will recognize, automatic traffic classification can occur with respect to non-tunneled and/or tunneled data flows. In one embodiment, auto-discovered traffic classes associated with tunneled data flows are added to a child "auto-discovered" traffic class of the parent tunnel traffic class. As discussed below, administrator interface 150 allows for configuration of bandwidth controls for auto-discovered traffic classes. In one embodiment, auto-discovered traffic classes are automatically assigned predefined or default bandwidth utilization controls. U.S. patent application Ser. No. 09/198,051, incorporated by reference herein, discloses automatic assignment of bandwidth utilization controls for discovered traffic classes.

The traffic discovery engine, in one embodiment, is supported by one to a plurality of traffic identification tables in a relational database that allow for identification of a traffic type (e.g., application, service, protocol, etc.) based on the attributes of a particular data flow. In one embodiment, the traffic discovery engine includes a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, the traffic discovery engine analyzes the control block object associated with the data flow against the service attributes in the services table to identify a service ID corresponding to the flow. In one embodiment, the traffic discovery engine may identify more than one service ID associated with the flow. In this instance, the traffic discovery engine associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, the traffic discovery engine associates the flow with the most specific service ID.

As discussed above, if the traffic discovery engine identifies a threshold number of flows for a given service for which no traffic class has been configured, it will create a traffic class corresponding to the service type in traffic classification database 137. In one embodiment, the traffic discovery engine constructs a set of matching rules based on the corresponding service attributes in the services table (and/or other tables associated with the service ID) and stores them in association with a traffic class identification in traffic classification database 137. In one embodiment, the traffic discovery engine further stores the default bandwidth management policy associated with the service ID in traffic classification database 137.

B. Tunnel Mechanism

Tunnel mechanism 32 includes functionality allowing for the establishment and operation of transformation tunnels between it and at least one compatible transformation tunnel partner. In one embodiment, tunnel mechanism 32 includes data transformation functionality (such as data encryption, data compression or caching functionality) and tunneling functionality based on standard transport and encapsulation protocols. In one embodiment, tunnel mechanism 32 includes a variety of transformation tunnel capabilities, including the ability to employ different transport and encapsulation protocols, as well as different data transformation capabilities. In one embodiment, tunnel mechanism 32 includes VPN client functionality operative to establish encrypted communication tunnels with compatible VPN systems, such as VPN server 72.

Transformation functionality generally transforms data from a first state to a second state (e.g., from a native state to an encrypted state, and vice versa). Compatible transformation functionality is operative to transform the data from the second state to substantially the first state. For example, according to some algorithms and data formats, de-compression does not recover all of the original data. Transformation functionality may include a variety of types and protocols. For example, tunnel mechanism 32 may include compression and/or decompression functionality, caching functionality, and encryption and/or decryption functionality, all of a variety of types and configurations. For example, tunnel mechanism 32 may include a plurality of data compression capabilities, such as compression functionality optimized for different kinds of data (e.g., text files, image files, audio files, etc.). Data transformation can be performed on just the packet data or on the entire packet (including header data) depending the implementation. In addition, tunnel mechanism 32 can operate on packets individually, or collect packets and transform them on an aggregate basis. In addition, tunnel mechanism 32 may operate to transform data from one compression format to another, proprietary compression format.

Tunnel mechanism 32 is also operative to handle the path between it and the tunnel partner corresponding to the path, using encapsulation and transport technologies, such as Generic Routing Encapsulation (GRE) protocol (RFC 2890), IP in IP Tunneling protocol (RFC 1853), and/or any other suitable protocol. Tunnel mechanism 32 also includes tunnel management functionality allowing for maintenance of tunnel state information, as well as recovery functionality that handles loss of tunnels, routing failures and other transmission errors, such as lost or out-of-order packet transmissions (if applicable to the transformation protocol). Tunnel mechanism 32 is also operative to recognize and handle circumstances where there are multiple paths between two end-systems.

In addition, the functionality of tunnel mechanism 32 may be incorporated into a device including other network related functionality, such as a firewall. For example, such a network device may combine VPN client and firewall functionality to selectively operate on network traffic as appropriate (e.g., VPN client operating on VPN traffic and firewall operating on regular network traffic).

II. Operation

A. Enforcement of Bandwidth Utilization Controls

Figure 4A:
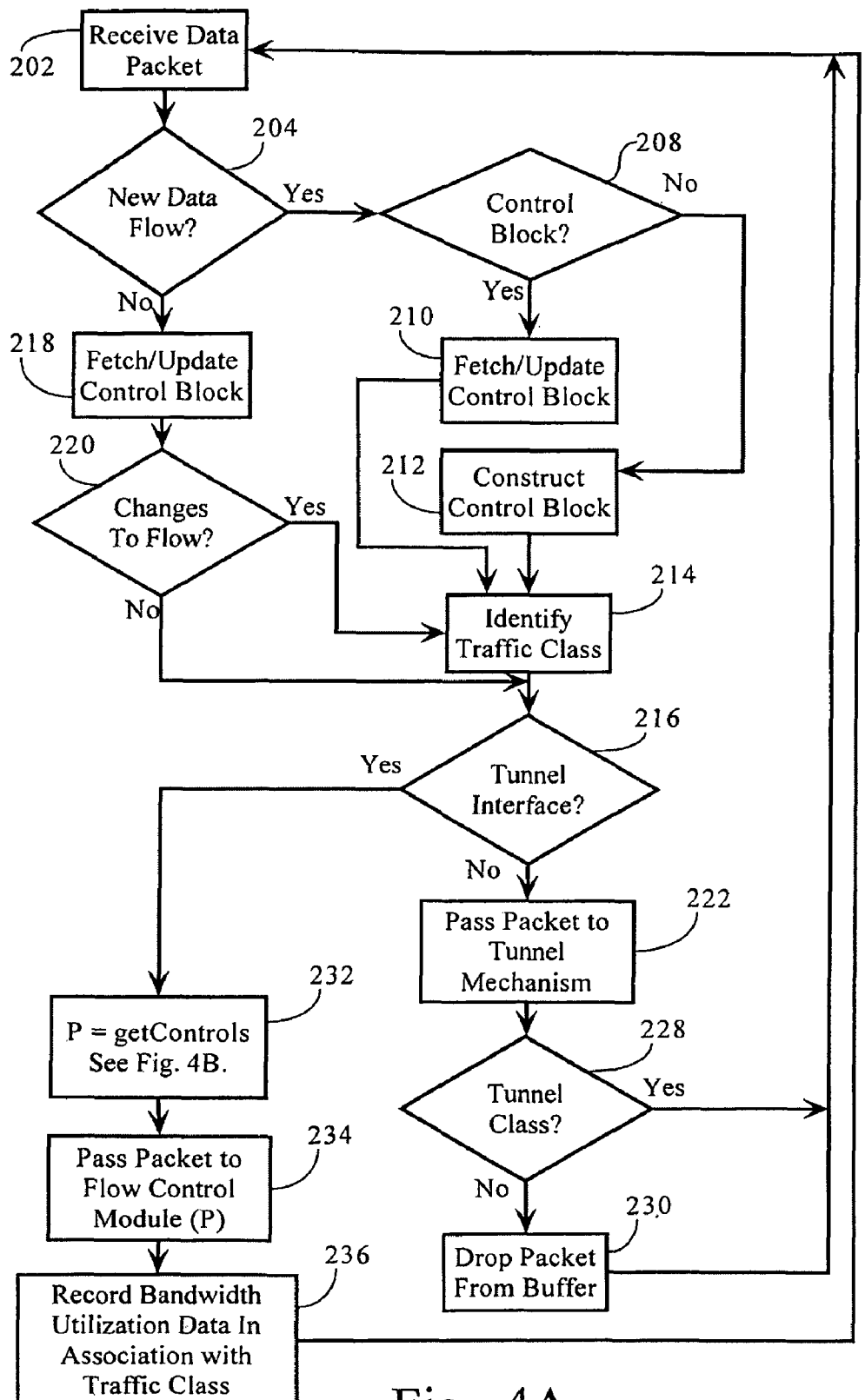
FIG. 4A is a flow chart providing a method directed to processing data packets to allow for enforcement of bandwidth utilization and other controls on network data flows.

FIGS. 4A and 4B illustrate a method, according to one embodiment of the present invention, directed to the identification of, and enforcement of bandwidth utilization controls on, tunneled and non-tunneled data flows transmitted across access link 21 and, therefore, traversing bandwidth management device 30. The details associated with the method, described herein, for enforcing bandwidth utilization controls, however, is not critical to the present invention; any suitable method can be employed. In one embodiment, packet processor 131 receives a data packet (FIG. 4A, step 202) and determines whether the packet is part of a new data flow (step 204) or represents a change to an existing data flow (see steps 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In some embodiments, packet processor 131 may have to encounter multiple packets to identify and fully characterize a new data flow (e.g., identify a service type, traffic class, etc.). For example, U.S. Pat. No. 6,046,980, identified above, discloses methods for classifying packet network flows.

If the packet corresponds to a new data flow, packet processor 131 determines whether flow database 135 contains an existing control block object corresponding to the flow (step 208) (see Section I.A.1., supra). If so, packet processor 131 retrieves the control block object, updates various attributes (e.g., last packet time, packet size, packet count, aggregate bytes, etc.), and associates the packet with the control block object (step 210). If flow database 135 does not contain a control block object associated with the new data flow, packet processor 131 constructs a control block object including attributes characterizing the data flow (step 212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type and other parameters characterizing the data flow.

If the packet corresponds to an existing data flow, packet processor 131 retrieves the control block object and updates attributes of the control block object and/or flow specification object as appropriate (e.g., last packet time, aggregate byte counts, etc.) (step 218). If elements of the data packet represent a change to the traffic type associated with the data flow (step 220), packet processor 131 passes the flow specification object to traffic classification database 137 to identify a traffic class corresponding to the flow (step 214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the flow specification and/or control block object (or a pointer to the flow specification/control block object) to traffic classification database 137. In one embodiment, the control block object and/or flow specification object or a copy of it is stored in association with the packet and in the same buffer structure to facilitate access to the control block and/or flow specification object by traffic classification database 137. As discussed in more detail below, traffic classification database 137 operates on attributes of the control block object and/or flow specification object to identify and return the traffic class(es) associated with the data flow (step 214). In one embodiment, the control block object in flow database 135 includes a pointer to the identified traffic class(es) in traffic classification database 137. In one embodiment, the traffic classification database 137 stores in the control block object the policy parameters (e.g., bandwidth utilization control parameters, security policies, etc.) associated with the identified traffic class(es).

For tunneled data flows, the individual packets are generally encapsulated by a tunnel header. In one embodiment, therefore, tunneled data flows (prior to (inbound) or after (outbound) transformation into native flows) are associated with a single control block, resulting in a one-to-many mapping of control block objects, as discussed below. Accordingly, the inside and outside IP addresses are the IP addresses corresponding to the tunnel endpoints. In one embodiment, as discussed above, the IP addresses of the tunnel endpoints are sufficient to identify a particular tunnel traffic class. In embodiments where the payload is encrypted or otherwise transformed, however, packet processor 131 has no access to the TCP/IP header information (as well as other higher layer information) in the native packet until after it has been transformed by tunnel mechanism 32. Accordingly, as discussed above, after processing a data flow, bandwidth management device 30 passes data flows originating on inside and outside interfaces 34 and 35, respectively, to tunnel mechanism 32 (see steps 216 and 222). As discussed below, in one embodiment, the rate at which the data packets are passed to the tunnel mechanism 32 can be paced based on one or more bandwidth utilization controls associated with an identified traffic class and based on feedback data associated with the corresponding packets/flows emanating from tunnel mechanism 32. In one embodiment, if the previous traffic classification identified a non-tunnel traffic class (step 228), packet processor 131 drops the packet from the buffer (step 230).

As discussed above, tunnel mechanism 32 receives the data flow and operates on the data flow if appropriate (e.g., if it is tunneled traffic). For example, if tunnel mechanism 32 is a VPN client, it strips the VPN header from the packets comprising the data flows and decrypts the data into native packets. Tunnel mechanism 32 then transmits the data flow to bandwidth management device 30 (either on inside or outside tunnel interface 36, 37 depending on the direction of the data flow). For purposes of processing data flows received from tunnel mechanism 32 on inside and outside tunnel interfaces 36 and 37, bandwidth management device 30 effectively treats them as separate flows and repeats the process described above. However, as FIG. 4A illustrates, data flows received on a tunnel interface 36 or 37 are not passed back to tunnel mechanism 32 (see step 216). Rather, bandwidth management device 30 performs a pre-processing step of associating control block objects corresponding to the original data flow and the data flow returned by tunnel mechanism 32 (step 232).

FIG. 4B illustrates a method, according to an embodiment of the present invention, directed to associating control block objects, if required, corresponding to a given data flow (before and after transformation by tunnel mechanism 32) for the purposes of ultimately applying bandwidth utilization controls. As FIG. 4B illustrates, packet processor 131 first retrieves the control block object associated with the current data flow (step 249). Packet processor 131 then determines whether the traffic class is a child traffic class of a tunnel traffic class (e.g., Tunnel1, Tunnel2 of FIG. 5) (step 250). If so, packet processor 131 locates the counterpart control block object(s) in flow database 135 corresponding to the original data flow (step 252). For example, in one embodiment, packet processor 131 scans flow database 135 for control block objects associated with active, outbound data flows that include a matching tunnel traffic class and the IP addresses of the tunnel endpoints. Depending on the state of bandwidth management device 30 and the data flows traversing it, this look up may result in a one-to-one mapping or a one-to-many mapping of control block objects. In the inbound direction, packet processor 131 performs a similar association in that, during a first classification, the tunnel traffic class (if any) is resolved by reference to the tunnel endpoints. During a second classification of the corresponding data flow emanating from tunnel mechanism 32, the tunnel traffic class is resolved by reference to an IP address/subnet pair corresponding to the actual end-systems.

To associate the corresponding control block objects, flow database 135 is initially configured (through administrator interface 150 and/or through automatic traffic discovery means in traffic classification database 137) to define which traffic corresponds to a given tunnel. In one embodiment, this is done by mapping the IP address ranges of the end-system hosts on either end to the IP address pair of the tunnel endpoints that the tunneled traffic will use. Any other standard classification mechanism, such as but not limited to traffic type, diffserv marking (RFC 2474) or IP Port number, can also be used to define what traffic corresponds to a given tunnel. In another embodiment, the network traffic entering a tunnel may be defined by explicitly defining what traffic does not correspond to the tunnel and thus allowing that all other traffic will be part of the tunnel.

Packet processor 131 scans flow database 135 for control block objects corresponding to active flows that match the defined mappings (see step 254 and 256). The packet is then passed to flow control module 132 (step 234), which accesses the control block object corresponding to the data flow to retrieve the bandwidth utilization or other controls (e.g., partition, policy, security controls, etc.) associated with the traffic class, retrieves metrics stored in the control block object (and other associated control block objects, if any) and enforces the bandwidth utilization controls on the data packet flow. In one embodiment, packet processor 131 drops the counterpart pre-tunnel packet(s) from the buffer. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. In addition, measurement engine 140 records data associated with the packet (step 236) to allow for analysis of bandwidth utilization and other network statistics on a tunnel, traffic class, access link, and/or partition level.

In some cases, many individual data flows may exist inside a single tunnel at a given point in time. This situation is handled by a one-to-many association where the single control block of a tunnel maps to the control blocks of multiple corresponding flows that may be simultaneously existing inside that tunnel. The single tunnel control block will contain both the sum of the statistics for all flows corresponding to the tunnel and the mapping to the individual data flows for discrete tracking. In one embodiment, this information is used to provide granular measurement of the amounts of various traffic types inside the tunnel.

In one embodiment, this information is used to effect partition controls on the traffic by limiting the aggregate amount of traffic in the tunnel. In one embodiment, the total partition size for a given tunnel may be determined dynamically based on the traffic-types of the constituent flows present inside the tunnel. For example, if it is determined (via the association) that the tunnel contains a large number of high priority flows, then it may be permitted to have a greater share of the total link bandwidth than it otherwise would if it contained only medium or low priority flows. In another embodiment, partition controls for the constituent traffic inside the tunnel may be determined based on the total amount of bandwidth available for the tunnel. For example, a certain traffic type inside the tunnel may be partitioned to receive 25% of the total available bandwidth of the tunnel.

In one embodiment, the aforementioned control is achieved by determining the total amount of bandwidth available to a given tunnel using methods such as those previously described for partitioning. Once this available bandwidth is computed for the tunnel control block object, the information passes, via the previously described association, to the control blocks associated with the constituent flows inside the tunnel. These constituent flows are then individually managed immediately on their next packet to the appropriate rate by flow control module 132, thus resulting in the bandwidth utilization of the tunnel as a whole being controlled to the desired level. In one embodiment, the individual constituent flows may be of different traffic types and accordingly, assigned different priority levels or bandwidth shares according to policy. The method described above permits the different traffic types to each be managed individually and to receive different shares of the bandwidth of the tunnel.

In one embodiment, on top of the process described above, a feedback factor may also be passed between the control blocks objects (via the association) to indicate the effects of transformation on bandwidth utilization. For example, if a compression process is delivering an average of 25% bandwidth reduction, this information is relayed to flow control module 132, telling it to take that into account for future scheduling of the individual flows coming into the tunnel mechanism 32 so that input bandwidth rate from the individual flows may be increased sufficiently to still deliver the desired output rate from the aggregate tunnel. Similarly, other tunnel transformation processes such as encryption may add overhead, requiring that the input be reduced to compensate.

One skilled in the art will recognize that other embodiments of the method described above are possible. For example, bandwidth management device 30, instead of transmitting all flows to tunnel mechanism 32, may be configured to selectively transmit data flows to tunnel mechanism 32 depending on the identification of a traffic tunnel class.

III. Exemplary Implementation

A. Layered Security Model

Embodiments of the present invention allow for application of security schemes featuring disparate treatment of non-tunneled and tunneled network traffic. Furthermore, embodiments of the present invention can be configured to implement a layered security model for internal, tunneled network traffic. For example, and in one embodiment, tunnel mechanism 32 is a VPN client incorporated into a VPN/firewall appliance. As discussed above, bandwidth management device 30 initially receives the data flows and transmits them to the VPN/firewall appliance. Depending on the type of network traffic (i.e., tunneled or non-tunneled), the VPN/firewall appliance operates on the data flows. For example, non-tunneled traffic is routed to firewall functionality which filters the non-tunneled network traffic applying, in one embodiment, perimeter security protocols, such as "deny, unless" rules.

For internal/tunneled traffic, a different security scheme is often desirable, since tunneled traffic emanates from an ostensibly secure and authenticated source. Accordingly, bandwidth management device 30 can be configured to implement a layered, security model for such tunneled traffic. Regular internet or non-tunneled traffic, however, requires a different security scheme (i.e., perimeter security) suitable for implementation by a firewall. As discussed more fully below, the traffic classification and control scheme applied to traffic within a given tunnel can be configured to implement a layered security scheme. For example, the hierarchical traffic classification scheme associated with tunnel traffic class node 84, for example, (see FIG. 5) can be configured to classify network traffic based on applications (e.g., Oracle, Peoplesoft, etc.), data transfer formats (e.g., Citrix-ICA, HTTP, etc.), specific IP addresses or subnets. The traffic classes configured by the network administrator may further include default and auto-discovered traffic classes, as well.

To implement a layered security scheme, a network administrator may associate a discard policy to each traffic class corresponding to unauthorized traffic, such as network traffic associated with a known hacking tool. As to authorized traffic classes, the network administrator may configure any suitable bandwidth utilization control, such as a rate policy, a priority policy and a partition. In one embodiment, bandwidth management device 30 includes the progressive bandwidth utilization control functionality disclosed in U.S. application Ser. No. 10/177,518, above. Accordingly, as to the default traffic class, the network administrator may configure a progressive bandwidth utilization control scheme to initially allow more packets to further classify and characterize the data flow and, depending on the ultimate classification, either allow or deny subsequent flows. For example, bandwidth management device 30 can be configured to initially allow up to a threshold number of packets or bytes for data flows associated with the default traffic class. After the threshold has been reached, additional packets associated with the data flow may be discarded if no application or other traffic type has been identified. Alternatively, a network administrator may configure bandwidth management device 30 to apply a partition or low priority policy to the data flow and, in one embodiment, transmit selected packets (based on classification) of the data flow to an intrusion detection system for filtering and possible detection of unauthorized and/or illicit activity. In one embodiment, bandwidth management device 30 can be configured to notify a network administrator of any new (auto-discovered) or unknown applications or network traffic within a given tunnel.

Lastly, although the present invention has been described as operating in connection with end systems employing the TCP and IP protocols, the present invention has application in computer network environments employing any suitable transport layer and network layer protocols. In addition, although embodiments of the present invention have been described as operating in connection with bandwidth management devices, the present invention can be applied to a variety of network devices, such as routers, caching mechanisms, or other network devices implementing traffic classification and control functionality. Moreover, the present invention can be applied to wireline computer networks, wireless computer networks, or a combination of both. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus facilitating concurrent classification and control of tunneled and non-tunneled data flows across an access link between a first computer network and a second computer network, comprising
    a tunnel mechanism including transformation tunnel capabilities operative to establish a communication tunnel with a remote network device having compatible transformation tunnel capabilities;
    a bandwidth management device operably connected to the tunnel mechanism, the bandwidth management device operably connected to the access link to monitor data flows between the first computer network and the second computer network;
    wherein the bandwidth management device is operative to:
        receive a first data flow from the first computer network;
        identify at least one traffic type corresponding to the first data flow;
        enforce a first bandwidth utilization control on the first data flow having a first target rate;
        transmit the first data flow to the tunnel mechanism;
        receive a second data flow from the tunnel mechanism;
        identify at least one traffic type corresponding to the second data flow;
        associate the first data flow to the second data flow;
        enforce a second bandwidth utilization control on the first data flow having a second target rate;
        transmit the second data flow to the second computer network; and
        adjust the first target rate based on feedback data derived from a difference between the first data flow and the second data flow.

2. The apparatus of claim 1 wherein the bandwidth management device is further operative to enforce at least one bandwidth utilization control on the second data flow, wherein the at least one bandwidth utilization control corresponds to the at least one traffic type identified in the second data flow or the first data flow.

3. The apparatus of claim 2 wherein enforcement of the at least one bandwidth utilization control is influenced by at least one metric associated with the first data flow.

4. The apparatus of claim 1 wherein the bandwidth management device is further operative to enforce at least one bandwidth utilization control on the first data flow, wherein the at least one bandwidth utilization control corresponds to the at least one traffic type identified in the second data flow or the first data flow.

5. The apparatus of claim 4 wherein enforcement of the at least one bandwidth utilization control is influenced by at least one metric associated with the second data flow.

6. The apparatus of claim 1 wherein the bandwidth management device is further operative to enforce at least one bandwidth utilization control on the first data flow and at least one bandwidth utilization control on the second data flow, wherein the at least one bandwidth utilization controls correspond to the at least one traffic type identified in the second data flow or the first data flow.

7. The apparatus of claim 6 wherein enforcement of the at least one bandwidth utilization controls is influenced by at least one metric associated with the first and/or second data flow.

8. The apparatus of claim 1 wherein the tunnel mechanism is operative to establish a secure communications tunnel with a remote device.

9. The apparatus of claim 8 wherein the tunnel mechanism is a VPN/firewall device operative to establish a secure communications tunnel with a remote device for tunneled traffic and further operative to filter non-tunneled traffic against at least one security control policy.

10. The apparatus of claim 1 wherein the bandwidth management device is operative to associate the first data flow to the second data flow, if the first data flow or the second data flow is a tunneled data flow.

11. An apparatus facilitating concurrent classification and control of tunneled and non-tunneled data flows across an access link between a first computer network and a second computer network, comprising
    a tunnel mechanism including transformation tunnel capabilities operative to establish a communication tunnel with a remote network device having compatible transformation tunnel capabilities;
    a bandwidth management device operably connected to the tunnel mechanism, and operably connected to the access link to monitor data flows between a first network and a second network,
    wherein the bandwidth management device is operative to:
        compute at least one metric associated with data flows traversing the bandwidth management device;
        detect data flows associated with a communications tunnel from the first computer network;
        channel data flows to the tunnel mechanism at a first rate;
        associate data flows corresponding to the communications tunnel from the first computer network to data flows emanating from the tunnel mechanism;
        transmit the data flows emanating from the tunnel mechanism to the second computer network; and
        adjust the first rate based on feedback data derived from a difference between the data flows channeled to the tunnel mechanism and the data flows emanating from the tunnel mechanism.

12. The apparatus of claim 11 wherein the bandwidth management device is further operative to enforce at least one bandwidth utilization control on at least one of the data flows emanating from the tunnel mechanism and the data flows emanating from the first computer network and channeled to the tunnel mechanism.

13. The apparatus of claim 12 wherein enforcement of the at least one bandwidth utilization control on the data flows emanating from the tunnel mechanism is influenced by at least one metric associated with corresponding data flows transmitted to the tunnel mechanism.

14. The apparatus of claim 13 wherein the bandwidth management device is further operative to enforce at least one bandwidth utilization control on at least one of the data flows emanating from the tunnel mechanism and the data flows emanating from the first computer network and channeled to the tunnel mechanism, wherein the at least one bandwidth utilization control corresponds to the at least one traffic type identified in either of the corresponding data flows.

15. The apparatus of claim 14 wherein enforcement of the at least one bandwidth utilization control is influenced by at least one metric associated with the corresponding data flows.

16. The apparatus of claim 11 wherein the bandwidth management device is further operative to enforce at least one bandwidth utilization control on the data flows channeled to the tunnel mechanism and at least one bandwidth utilization control on the data flows emanating from the tunnel mechanism.

17. The apparatus of claim 16 wherein the at least one bandwidth utilization controls correspond to at least one traffic type associated with either of said flows.

18. An apparatus enabling concurrent classification and control of tunneled and non-tunneled data flows across an access link between a first computer network and a second computer network, comprising
  a tunnel mechanism including transformation tunnel capabilities operative to establish a communication tunnel with a remote network device having compatible transformation tunnel capabilities;
  a bandwidth management device operably connected to an access link between a first computer network and a second computer network, wherein the bandwidth management device comprises:
    an inside interface, an outside interface, an inside tunnel interface and an outside tunnel interface,
    wherein the inside interface provides the communications interface between the bandwidth management device and the first computer network,
    wherein the outside interface provides the communications interface between the bandwidth management device and the second computer network, and
    wherein the inside tunnel interface and the outside tunnel interface provide communications interfaces to the tunnel mechanism;
  a packet processor operative to monitor data flows in relation to at least one metric;
  a traffic classification database operative to identify traffic types corresponding to data flows; and
  a bandwidth control mechanism operative to enforce bandwidth utilization controls on data flows associated with corresponding traffic types;
  wherein the bandwidth management device is operative to:
    receive a first data flow from the first computer network;
    transmit the first data flow to the tunnel mechanism at a first rate;
    receive a second data flow from the tunnel mechanism;
    associate the first data flow to the second data flow; and
    adjust the first rate based on feedback data derived from a difference between the first data flow and the second data flow.

19. The apparatus of claim 18 wherein the bandwidth control mechanism is operative to enforce bandwidth utilization controls on the second data flow based, in part, on at least one metric associated with the first data flow.

20. A method facilitating concurrent classification and control of tunneled and non-tunneled network traffic, the method comprising:
  receiving a first data flow from a first computer network;
  identifying at least one traffic type corresponding to the first data flow;
  transmitting the first data flow to a tunnel mechanism at a first rate;
  receiving a second data flow from the tunnel mechanism;
  identifying at least one traffic type corresponding to the second data flow;
  associating the first data flow with the second data flow; and
  adjusting the first rate based on feedback data derived from a difference between the first data flow and the second data flow.

21. The method of claim 20 further comprising
  enforcing at least one bandwidth utilization control on the second data flow, wherein the enforcing step is based on at least one characteristic of the first data flow and at least one characteristic of the second data flow.

22. The method of claim 20 further comprising
  enforcing at least one bandwidth utilization control on the transmission of the first data flow to the tunnel mechanism based, at least in part, on at least one metric associated with the second data flow.

* * * * *

UNITED STATES PATENT AND TRADEMARK OFFICE
CERTIFICATE OF CORRECTION

PATENT NO. : 7,778,176 B2  Page 1 of 1
APPLICATION NO. : 11/951101
DATED : August 17, 2010
INVENTOR(S) : Michael Robert Morford It is certified that error appears in the above-identified patent and that said Letters Patent is hereby corrected as shown below:

On the Title page, Item (63) and at Column 1, under Related U.S. Application Data, insert -- Continuation of application No. "10/260,802, filed on September 30, 2002, now patent no. 7,324,447" --.

Signed and Sealed this

Ninth Day of November, 2010

David J. Kappos
*Director of the United States Patent and Trademark Office*